Patented Mar. 20, 1928.

1,663,141

UNITED STATES PATENT OFFICE.

SAMUEL RUBEN, OF NEW YORK, N. Y.

SOLDERING MATERIAL.

No Drawing.   Application filed October 1, 1926.   Serial No. 139,021.

This invention relates to a soldering material and more particularly it relates to the composition of a material adapted to soldering bodies composed of aluminum and the alloys thereof; the material may also be used as a solder for other metals, but it is especially adapted for use with aluminum and its alloys.

The object of the invention is to provide a practicable means for binding together without welding or fusion, aluminum and aluminum alloy bodies.

Soldering materials of the prior art used to bind together aluminum surfaces have required application at temperatures so high as to cause excessive surface oxidation, thereby preventing proper surface alloying, excessive electrolytic potential at the surface contacts, and causing rapid corrosion, especially where other electrolytes are used; or the excessively large crystalline structures of the soldering materials cause their separation from the base metals when the latter are flexed, due to the crystal rigidity; or fluxes are required, in some instances increasing the electrolytic corrosion, and causing carbonization of organic materials where such are used in flux compound which prevent proper surface unions.

To effect enduring surface unions between metal bodies, the electrolytic potential between the solder and the metal bases must be a minimum, the solder must readily flux at practicable application temperatures and adhere so closely to the contacting metals that when flexed with the bases, it will not separate therefrom. Further, the alloy or soldering material must be stable and resistant to corrosion attacks.

To meet the physical, chemical and electrochemical requirements, a solder has been developed substantially according to the following formula: lead, 34%, tin 34%, zinc 31% and magnesium 1%. The purpose of the magnesium content is to raise the electropositive character of the solder, thereby making it possible to effect a ready alloying with an aluminum base in a strong and permanent juncture and requiring no flux in application. The zinc content also assists in obtaining the desired electropositive characteristic and also to make the mixture more stable.

The electrochemical potential of the mixture with the contacting metal is closely controlled by the magnesium content. It has been found that for the best results this element should be within very close limits of one per cent of the mixture; if substantially below this figure the solder will not alloy with the base metal without the use of a flux, and a base of aluminum requires a careful cleaning immediately before the solder application. A magnesium content substantially above that stated does not satisfactorily withstand corrosion attacks by saline and other solutions, due to the excessive electropositive character of the solder, and permits decomposition.

The various elements of the solder are preferably assembled in powdered form and heated in a non-oxidizing atmosphere to about 800 deg. C. and thoroughly mixed and then cast. The solder is applied to metal surfaces with the ordinary "copper iron" in the customary manner.

What I claim is:

1. A solder compound of substantially lead 34%, tin 34%, zinc 31% and magnesium 1%.

2. The method of making aluminum solder which consists in blending in powdered form substantially 34 parts of lead, 34 parts of tin, 31 parts of zinc and 1 part magnesium and heating the mixture to substantially 800° centigrade in a non-oxidizing atmosphere and casting the molten mass.

In testimony whereof, SAMUEL RUBEN has signed his name to this specification.

SAMUEL RUBEN.